United States Patent Office 3,336,477
Patented Aug. 15, 1967

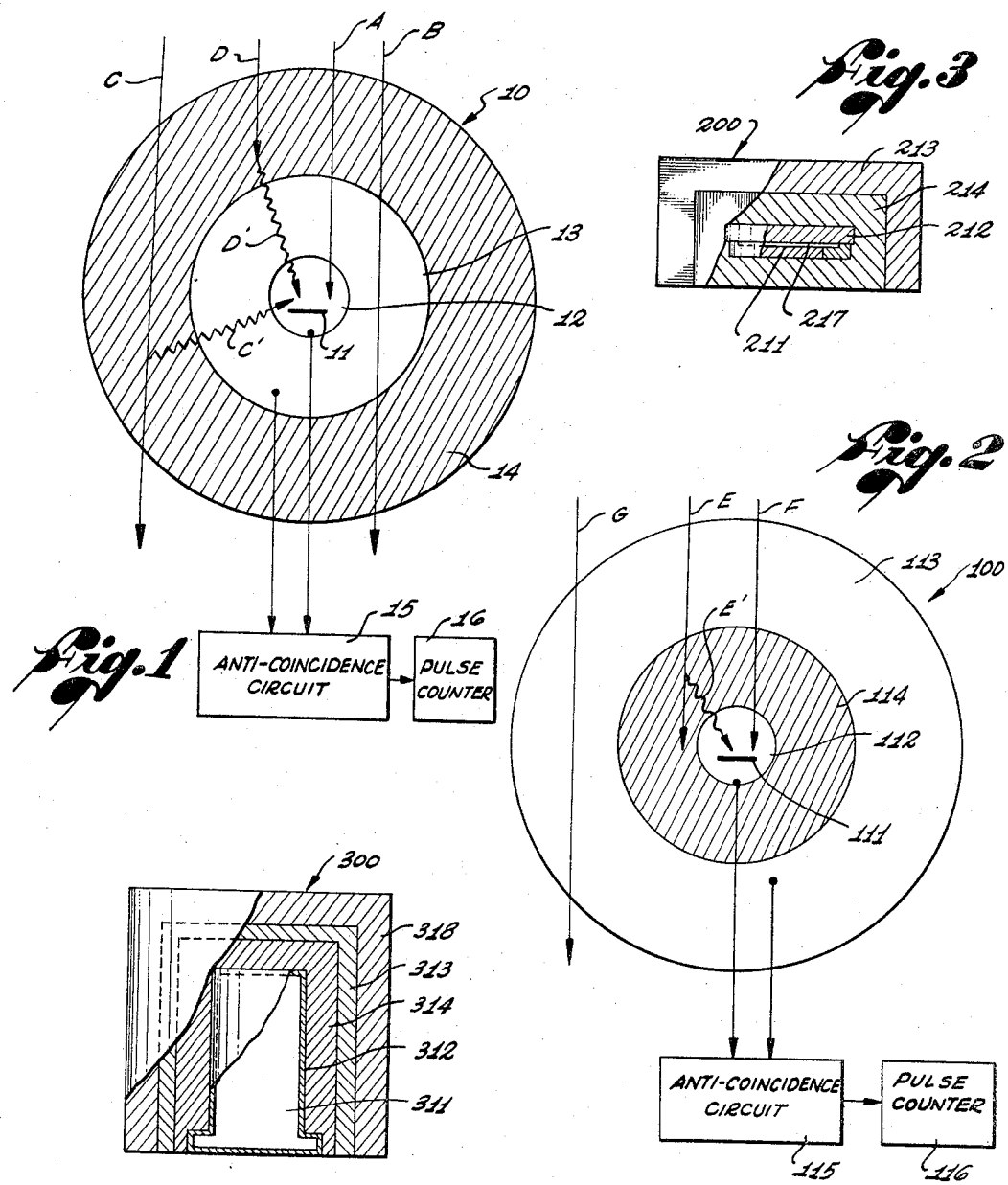

3,336,477
LOW BACKGROUND BETA DETECTION HAVING A SHIELD SEPARATING A BETA DETECTOR AND A COSMIC RAY DETECTOR
Rodman A. Sharp, La Jolla, Calif., assignor to Beckman Instruments, Inc., Fullerton, Calif., a corporation of California
Filed Oct. 28, 1963, Ser. No. 319,415
4 Claims. (Cl. 250—71.5)

This invention relates generally to methods and apparatus for detecting radioactivity, and more particularly to a new and improved method and means for accomplishing low background beta detection.

All beta detectors have a "background count rate," the latter being defined as the counting rate of the detector when there is no radioactive sample near the detector. Hence, the beta detector with the lowest background count rate, all other factors being equal, is capable of detecting and distinguishing the lowest levels of radioactivity in a given sample. Generally speaking, therefore, the lower the background of the detector, the more sensitive the detector.

In the conventional beta detection systems of the prior art, the background count rate may be attributed to one or more of several sources including: alpha, beta and gamma contamination of the materials from which the detector is made; environmental gamma radiation present everywhere from natural radioactivity and fallout; gamma radiation emitted by natural and artificial radioactive contaminants present in the heavy shielding material usually used with the detectors; neutrons associated with extraterrestrial effects (as indicated by the variation of neutron intensity with latitude and solar activity); cosmic ray primaries in the form of mu mesons and the like; and cosmic ray secondaries generated by the decay of primary mu mesons and the like.

Usually, in typical low background beta detectors, the background count rate influence of the cosmic ray secondaries generated by mu meson decays constitutes only a small percentage of the total background count rate. However, in precision equipment designs, where extreme care has been taken to minimize the effects of other background sources, e.g., by using pure detector construction and shielding materials, neutron moderators and anti-coincidence electronic circuit techniques, the influence of cosmic ray secondaries upon the background count rate becomes very significant.

The incident meson flux at sea level is about 1 meson per square centimeter per minute, with the intensity varying as the cosine squared of the zenith angle. About 20% of these mu mesons are stopped in traversing a radiation shield having a thickness of about 10 centimeters for lead or 20 centimeters for iron. The positive mu+ mesons which stop and decay within the shield release a positron of 35 mev. most probable energy. This positron is then absorbed in the shield by generating Bremsstrahlung and positron-negatron pairs of lower energy. The negative mu mesons are captured by the nuclei of the radiation shield, where the mu mesons deposit their energy to cause the shield nuclei to break up and emit secondary mesons, neutrons and gamma rays. Typically, two or three neutrons of 6–12 mev. energy are released for each captured mu meson. Much of the remaining 80% of the primary cosmic radiation which is not stopped by the shield interacts with the nuclei of the shield and, in releasing portions of their energy, produce neutron and gamma ray secondaries, while other mu mesons collide with shield electrons to produce electron secondaries with energy levels up to a few mev.

In conventional low background beta detection systems, it has been the general practice to physically orient a sample beta detector, cosmic ray anti-coincidence counter, and a heavy radiation shield so that the cosmic ray counter is placed immediately adjacent the sample detector in such a way as to intercept most of the primary mu mesons penetrating the sample detector, with the heavy radiation shielding in turn surrounding the cosmic ray counter. Although such arrangements have generally served their purpose, they have not proved entirely satisfactory for precise measurement of low level beta radioactivity in a sample. The reason for this has been the inability of such beta detection systems to counteract the background effects of cosmic ray secondaries, which may produce counts in the beta detector without producing corresponding counts in the cosmic ray detector, and hence are not blanked by the anti-coincidence circuit. This can occur because the probability of counting a cosmic ray secondary in either the beta detector or the cosmic ray detector is very low. Hence, when a cosmic ray secondary occasionally produces a count in the beta detector, the probability of obtaining a simultaneous blanking count in the cosmic ray detector is low. Therefore, those concerned with the development of beta detection systems have long recognized the need for improved beta detectors having lower background count rates. The present invention fulfills this need.

Accordingly, it is an object of the present invention to provide a new and improved method and means for low background beta detection which overcomes the above and other disadvantages of the prior art.

Another object is to provide an improved method and means of low background beta detection which reduces the contribution of cosmic ray secondaries to the background count rate.

A further object of the invention is the provision of a method and means for effectively blanking counts due to decay of primary cosmic radiation with a beta detection system.

Still another object is to provide a new and improved radioactivity detection system wherein a cosmic ray anti-coincidence counter is physically oriented so as to intercept substantially all of the cosmic rays incident upon a radiation shield surrounding a sample detector.

Yet another object of the present invention is the provision of a new and improved low background beta detection system which is highly efficient, relatively compact and economical.

The above and other objects and advantages of this invention will become apparent from the following description, when taken in conjunction with the accompanying drawings, and wherein:

FIGURE 1 is a partially schematic view of an essentially conventional beta detection system, and illustrates the problem of unblanked cosmic ray secondaries;
FIGURE 2 is a partially schematic view of a low background beta detection system, in accordance with the present invention, and which obviates the problem of unblanked cosmic ray secondaries;

FIGURE 3 is an elevational view, portions being broken away and in section, illustrating one embodiment of a low background beta detection system of the present invention; and FIGURE 4 is an elevational view, portions being broken away and in section, illustrating a second embodiment of a low background beta detection system in accordance with the invention.

Referring now to the drawings, and particularly to FIGURE 1 thereof, there is shown a conventional beta detection system 10 for measuring the level of beta radiation from an appropriate sample 11. The sample 11 is located within, or closely adjacent to, a sample detector 12 which is highly sensitive to beta radiation. The sample detector 12 is surrounded by a second radiation detector 13 which is sensitive to cosmic rays such as mu mesons or the like. The cosmic ray detector 13 is, in turn, surrounded by a heavy radiation shield 14.

The electrical output of each of the detectors 12, 13 is directed to an electrical anti-coincidence circuit 15, typically a NAND gate or other anti-coincidence electrical network well known in the art, the output of which is in turn directed to a pulse counter 16. In this manner, the pulse counter 16 responds only to counts from the sample detector which are not common to both of the detectors 12, 13.

The operation of the beta detection system of FIGURE 1 is as follows: Beta rays originating from the sample 11 are detected by the sample detector 12, but do not penetrate to and are not detected by the cosmic ray detector 13. Hence, the counts produced by such beta rays pass unblanked through the circuit 15 to the counter 16. On the other hand, a cosmic ray A which passes through the shield 14 and both of the detectors 12, 13 produces essentially simultaneous pulses in both the cosmic ray detector and the beta detector, since the beta detector 12 is inherently also sensitive to primary cosmic radiation. Since the anti-coincidence circuit receives essentially simultaneous electrical pulses from the detectors 12, 13, the pulses are blanked and, therefore, the counter 16 exhibits no response due to the incidence of the cosmic ray A.

If a cosmic ray B should pass through the shield 14 and cosmic ray detector 13, but not through the sample detector 12, the anti-coincidence circuit 15 is designed to blank the pulse from the cosmic ray detector in view of the absence of a pulse from the sample detector. In other words, the anti-coincidence circuit 15 is designed to pass pulses only from the beta detector to the counter 16, and it will do so only for those beta detector pulses which are not coincident with the pulses from the cosmic ray detector 13. In this manner, the beta detection system of FIGURE 1 effectively reduces the background count rate of the system due to primary cosmic radiation incident upon the system.

Although the beta detection system of FIGURE 1 is thus effective in counteracting the influence of primary cosmic rays, it is incapable of compensating for background effects due to cosmic secondaries. For example, the cosmic ray C may pass completely through the outer radiation shield 14, without passing through the cosmic ray detector 13. In so doing, the primary ray C may give up part of its energy to generate a cosmic ray secondary C' which penetrates to the beta detector 12. Similarly, a cosmic ray D may be stopped by the radiation shield 14, and thus decay to produce a secondary cosmic ray D' which may also penetrate to the beta detector 12.

Both of the cosmic ray and beta detectors 12, 13 are very low efficiency detectors of cosmic ray secondaries such as C' and D' (typical efficiencies being of the order of magnitude of 1%). Hence, typically 1% of the secondary cosmic rays which penetrate to the sample detector 12 will be detected by the latter, and only about 1% of these, or 1 in 10,000, will also be detected by the cosmic ray counter and blanked via the anti-coincidence circuit 15. As a result, the beta detection system of FIGURE 1 may have an over-all background detection efficiency of the order of 0.99% for secondary cosmic rays generated in the radiation shield 14, and only 1% of the cosmic ray secondaries detected by the sample detector will be detected and blanked by the cosmic ray detector. A background detection efficiency of this magnitude is significant in applications calling for precise measurement of low level beta radiation.

Referring now to FIGURE 2, a beta detection system 100, in accordance with the present invention, includes elements 111–116 corresponding to the elements 11–16, respectively, of the detection system shown in FIGURE 1. The beta sample detector 112 may be any appropriate type of beta detector, such as a Geiger counter, gas proportional counter, plastic phosphor liquid scintillation counter, spark counter, biased junction solid state detector, or the like. Similarly, the cosmic ray detector 113 may be any type of detector capable of detecting cosmic ray mu mesons.

It will be observed in FIGURE 2 that the positions of the cosmic ray detector 113 and radiation shield 114 have been transposed from the positions of their corresponding elements in the detection system shown in FIGURE 1. Hence, the radiation shield 114 completely surrounds the beta sample detector 112, and is located between the beta detector and the cosmic ray detector 113. The cosmic ray detector in turn surrounds enough of the radiation shield 114 so that it intercepts essentially all (in a practical sense at least 95%, and preferably at least 99%) of the cosmic radiation incident upon the shield 114. This shield 114 should be thick enough to effectively remove the effects of environmental gamma radiation as well as secondary decay products arising from mu mesons interactions occurring in the environment external to the shielding. To satisfy both of these requirements usually requires a shield thickness of at least 7 centimeters of lead, or 14 centimeters of steel or copper or combinations thereof. The shield materials must also be free of all radioactive contaminants.

As will be apparent in FIGURE 2, it is impossible with the radiation detection system of the present invention for a cosmic secondary generated within the shield 114 to be detected by the sample detector 112 without a coincident blanking pulse also being essentially simultaneously produced in the cosmic ray detector 113, due to the initial incidence of the very same primary cosmic ray which decayed in the shield to generate the detected secondary ray. For example, the primary cosmic ray E which is illustrated as producing a secondary cosmic ray E' in the shield 114, the latter secondary penetrating to the beta ray detector 112, must inherently also pass through and be detected by the cosmic ray detector 113. Hence, if the secondary cosmic ray E' is detected by the sample detector, so that a pulse is directed from the detector 112 to the anti-coincidence circuit 115, a blanking pulse will also be available from the cosmic ray detector 113 to prevent counting of the secondary cosmic ray.

If a primary cosmic ray F passes through both detectors 112, 113, then the pulses produced thereby will be blanked in the same manner as with the detection system of FIGURE 1.

If a primary cosmic ray G should pass through the cosmic ray detector 113, without being incident upon either the shield 114 or the sample detector 112, then the operation is the same as for the ray B in FIGURE 1, and the pulse counter 116 will not respond.

Hence, the beta detection system of FIGURE 2 effectively eliminates the background count rate due to secondary cosmic rays and, therefore, is capable of much more precise low level beta measurements than the conventional detection system of FIGURE 1. The differences in radiation measurement efficiencies for the two systems are shown in the following tables:

TABLE I.—DETECTION SYSTEM OF FIGURE 1

| Type of Radiation | Unblanked Detector Counting Efficiency | Blanked Detector Counting Efficiency |
|---|---|---|
| Beta rays from sample | Up to 100% | Up to 100%. |
| Primary cosmic rays (background) | do | Essentially 0%. |
| Secondary cosmic rays (background) | 1% | 0.99%. |

TABLE II.—DETECTION SYSTEM OF FIGURE 2

| Type of Radiation | Unblanked Detector Counting Efficiency | Blanked Detector Counting Efficiency |
|---|---|---|
| Beta rays from sample | Up to 100% | Up to 100%. |
| Primary cosmic rays (background) | do | Essentially 0%. |
| Secondary cosmic rays (background) | 1% | Do. |

FIGURES 3 and 4 illustrate two embodiments 200, 300, respectively, of the radiation detection system illustrated schematically in FIGURE 2. In this connection, elements 211–214 in FIGURE 3, and elements 311–314 in FIGURE 4 correspond to like elements 111–114 in the beta detection system of FIGURE 2. In the arrangement of FIGURE 3, a solid sample 211 is located adjacent a radiation window 217, so that beta rays emanating from the sample are incident upon a disc-shaped sample detector 212.

In the arrangement of FIGURE 4, the sample 311 is in gaseous form within a beta detector 312 of the internal gas detector type. The beta detection system of FIGURE 4 also includes an option neutron moderator layer 318 containing an appropriate neutron capturing reach the sample detector. Although the neutron moderator layer 318 is illustrated as being external to the cosmic ray detector 313, this is by way of example only, and the layer 318 may also be located immediately around the sample detector or in an intermediate layer between the radiation shield 313 and the cosmic ray detector.

The aforedescribed method and means of low background beta detection, in accordance with the present invention, satisfies a long-existing need in the radiation art for beta detection systems wherein the background count rates due to cosmic ray secondaries are minimal.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:
1. In a system for detecting beta radiation, the arrangement comprising:
   a sample beta detector sensitive to beta, gamma and cosmic radiation;
   a radiation shield substantially completely surrounding said sample beta detector and being of sufficient thickness to stop essentially all gamma radiation and secondary radiation from meson decays in an external environment from reaching said sample beta detector;
   a cosmic ray detector surrounding said radiation shield to an extent adequate to intercept essentially all of the cosmic ray meson radiation incident upon said radiation shield;
   and electrical anti-coincidence means for receiving pulses from each of said detectors and adapted to pass only those pulses from said beta detector which are not coincident with pulses from said cosmic ray detector.

2. A beta detection system as set forth in claim 1, wherein said radiation shield is of insufficient thickness to stop all cosmic ray secondaries generated within said shield from penetrating to said sample detector.

3. A beta detection system as set forth in claim 1, including neutron moderator means for preventing external neutrons from penetrating to said beta detector.

4. A radiation detection system as set forth in claim 1, including counting means responsive to pulses passed by said anti-coincidence means.

References Cited
UNITED STATES PATENTS

| 2,481,506 | 9/1949 | Gamertsfelder | 250—83.1 |
| 2,535,066 | 12/1950 | Herzog | 250—83.6 |
| 2,543,676 | 2/1951 | Thayer | 250—83.1 |
| 2,562,962 | 8/1951 | Stratford | 250—83.6 |
| 2,562,968 | 8/1951 | Teichmann | 250—83.6 |
| 2,937,278 | 5/1960 | Copeland | 250—83.3 |
| 3,015,729 | 1/1962 | Spaa | 250—83.3 |

RALPH G. NILSON, *Primary Examiner.*

JAMES W. LAWRENCE, *Examiner.*

S. ELBAUM, *Assistant Examiner.*